United States Patent
Turner et al.

(10) Patent No.: US 10,694,816 B2
(45) Date of Patent: Jun. 30, 2020

(54) UPPER FOR A SHOE

(71) Applicant: adidas AG, Herzogenaurach (DE)

(72) Inventors: Andrew Graham Turner, Herzogenaurach (DE); Marc Illan Arana, Herzogenaurach (DE); Adrien Francois Michel Noirhomme, Herzogenaurach (DE); Maximilian Gassner, Herzogenaurach (DE); Philipp Alexander Hagel, Herzogenaurach (DE); Florian Fleischer, Herzogenaurach (DE); Nicholas Schiller, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 58 days.

(21) Appl. No.: 15/695,442

(22) Filed: Sep. 5, 2017

(65) Prior Publication Data
US 2018/0064210 A1    Mar. 8, 2018

(30) Foreign Application Priority Data
Sep. 5, 2016    (DE) .................. 10 2016 216 716

(51) Int. Cl.
*A43B 23/02*    (2006.01)
*A43B 5/02*    (2006.01)
(Continued)

(52) U.S. Cl.
CPC .......... *A43B 23/027* (2013.01); *A43B 1/0072* (2013.01); *A43B 1/02* (2013.01);
(Continued)

(58) Field of Classification Search
CPC ......... A43B 5/02; A43B 5/025; A43B 23/025; A43B 23/0265; A43B 23/027; A43B 23/0295
(Continued)

(56) References Cited

U.S. PATENT DOCUMENTS

| 586,137 | A | * | 7/1897 | Medgfr | ................ | A43B 23/024 |
| | | | | | | 36/3 R |
| 2,240,626 | A | * | 5/1941 | Ochs | .................... | A43B 1/0072 |
| | | | | | | 12/142 V |

(Continued)

FOREIGN PATENT DOCUMENTS

| CA | 2417160 | 1/2002 |
| CA | 2776110 | 11/2012 |

(Continued)

OTHER PUBLICATIONS

Japanese Patent Application No. 2017-169241, Office Action dated Dec. 11, 2018, 9 pages (5 pages for the original document and 4 pages for the English translation).
(Continued)

*Primary Examiner* — Ted Kavanaugh
(74) *Attorney, Agent, or Firm* — Kilpatrick Townsend & Stockton LLP

(57) ABSTRACT

An upper for a shoe, in particular a sports shoe, includes at least one tape covering at least 50% of the upper. At least one tape portion includes a plurality of connected tapes. A further aspect relates to an upper for a shoe, in particular a sports shoe, including at least one tape portion including a plurality of connected tapes. In some connected tapes, the tapes are zig-zag stitched to each other on their edges.

30 Claims, 5 Drawing Sheets

(51) Int. Cl.
  *A43B 1/02* (2006.01)
  *A43B 1/00* (2006.01)
  *A43B 5/04* (2006.01)
  *A43B 5/06* (2006.01)
  *A43B 13/02* (2006.01)
  *A43B 23/07* (2006.01)

(52) U.S. Cl.
  CPC ............... *A43B 5/02* (2013.01); *A43B 5/025* (2013.01); *A43B 5/0401* (2013.01); *A43B 5/06* (2013.01); *A43B 13/02* (2013.01); *A43B 23/025* (2013.01); *A43B 23/0215* (2013.01); *A43B 23/0235* (2013.01); *A43B 23/0245* (2013.01); *A43B 23/0265* (2013.01); *A43B 23/0295* (2013.01); *A43B 23/07* (2013.01)

(58) Field of Classification Search
  USPC .................................................... 36/2 A, 2 B
  See application file for complete search history.

(56) References Cited

U.S. PATENT DOCUMENTS

| | | | | |
|---|---|---|---|---|
| 2,412,808 | A * | 12/1946 | Goldstein | ................ A43B 1/04 36/11.5 |
| 3,193,948 | A * | 7/1965 | Appleby | ............ A43B 23/0255 156/166 |
| 3,589,038 | A | 6/1971 | Sailer | |
| 4,616,432 | A | 10/1986 | Bunch et al. | |
| 6,083,185 | A | 7/2000 | Lamont | |
| 6,539,647 | B2 | 4/2003 | Diaz et al. | |
| 7,028,420 | B2 | 4/2006 | Tonkel et al. | |
| 7,204,042 | B2 | 4/2007 | Aveni et al. | |
| 8,544,192 | B2 | 10/2013 | Schroeder et al. | |
| 9,113,675 | B2 | 8/2015 | Vanatta et al. | |
| 9,198,479 | B2 | 12/2015 | Dojan et al. | |
| 2006/0059715 | A1 * | 3/2006 | Aveni | ...................... A43B 7/08 36/45 |
| 2008/0083138 | A1 | 4/2008 | Lacorazza et al. | |
| 2010/0107442 | A1 * | 5/2010 | Hope | .................. A43B 23/024 36/50.1 |
| 2012/0204448 | A1 | 8/2012 | Bracken | |
| 2013/0312284 | A1 | 11/2013 | Berend et al. | |
| 2018/0049509 | A1 * | 2/2018 | Zwick | ..................... A43B 1/04 |

FOREIGN PATENT DOCUMENTS

| | | |
|---|---|---|
| CH | 213236 A | 1/1941 |
| CN | 1791338 | 6/2006 |
| CN | 102238884 | 11/2011 |
| CN | 105246362 | 1/2016 |
| CN | 205162058 | 4/2016 |
| DE | 202011005160 U1 | 9/2012 |
| EP | 0960578 | 1/2003 |
| EP | 1467637 | 1/2003 |
| EP | 2520188 | 11/2012 |
| FR | 2536964 | 6/1984 |
| GB | 761519 | 11/1956 |
| GB | 1156907 | 7/1969 |
| JP | 2015144812 | 8/2015 |
| WO | 2014152202 | 9/2014 |
| WO | 2014209596 | 12/2014 |

OTHER PUBLICATIONS

German Application No. 102016216716.2, Office Action dated Jan. 12, 2018, 6 pages.
European Application No. 17188942.1, Extended European Search Report dated Jan. 23, 2018, 8 pages.
German Patent Application No. 102016216716.2, Office Action dated Apr. 12, 2017, 6 pages (No English translation available. A summary of the Office Action is provided in the Transmittal Letter submitted herewith).
Japanese Application No. 2017-169241, Office Action dated Aug. 6, 2019, 6 pages (3 pages of English translation and 3 pages of Original document).
Chinese Patent Application No. 201710790176.5, Office Action dated Nov. 5, 2019, 18 pges (9 pages of translation and 9 pages of Original document).
German Application No. 102016216716.2, Office Action dated Jul. 20, 2017, 7 pages (English summary provided).
German Application No. Office Action dated Oct. 24, 2018, 7 pages (English summary provided).

* cited by examiner

US 10,694,816 B2

UPPER FOR A SHOE

REFERENCE TO RELATED APPLICATIONS

This application is related to and claims priority benefits from German Patent Application No. DE 10 2016 216 716.2, filed on Sep. 5, 2016 and entitled UPPER FOR A SHOE, the content of which is hereby incorporated by reference in its entirety.

FIELD OF THE INVENTION

The present invention relates to an upper for a shoe, in particular for a sports shoe. Moreover, the present invention relates to a shoe.

BACKGROUND

An upper for a shoe generally provides a number of functionalities. In addition to providing the enclosure for receiving the foot, an upper may stabilize the foot during movements, protect the foot against the environment and, in case of certain sport shoes, even provides a surface specifically adapted to the needs of the athlete. For example, a soccer shoe may provide enhanced grip to allow a player to better control a ball. In another example, a rugby shoe may provide an upper with improved stiffness properties during a scrum.

Most of the functionalities of the upper require an increased stability of the foot inside the upper. One option to increase the stability of the foot is to provide uppers with tapes. Various uppers applied with tapes are known, for example from CN205162058U, U.S. Pat. No. 3,589,038A, FR2536964A1, CN1791338A, U.S. Pat. No. 6,083,185A, CA2417160C, CN105246362A. Further prior art in this regard is disclosed in GB1156907A, CA2776110A1, WO2014152202A1, U.S. Pat. No. 4,616,432A, US20120204448A1, U.S. Pat. No. 7,204,042B2 and U.S. Pat. No. 9,198,479B2.

EP 0960578B1 discloses a shoe using a molded bottom provided with a sole, a hollow point, a heel support, lateral edges and a series of slots or through openings into which straps provided with ordinary closing means, such as clips or Velcro inserts, that form the upper are inserted, wherein in the shoe is characterized in that the first slot or through opening is located, at least in a section, under the hollow point, while the last slot or through opening is located on the heel support; said straps are partially located above the hollow point and feature an overlapping arrangement, so that the foot is completely covered, from the hollow point to the neck.

U.S. Pat. No. 6,539,647B2 discloses an improved safety shoe for protecting a person's foot from harmful injury including a high impact resistant outer shell, an inner dense foam insert, a solid toe cap, a heel cup, an inner sole, an outer sole and a moisture dissipating material surrounding the dense foam insert. The outer shell includes a series of flexible interlocking sliding bands arranged surrounding the foot and folding under the foot between the outer sole and the inner sole.

GB 761,519 discloses a shoe upper of canvas, leather or other non-elastic material having a foot-receiving opening formed at the front by the inner edges of a relatively small panel and a strip, and at the sides and back by the inner edges of a U-shaped strip formed as an upward extension on a strip secured to the top edge of the upper to project inwards from the sides. The aforementioned parts are of knitted or woven fabric with transversely extending rubber threads, with thick rubber threads at the junctions of the parts.

However, the uppers of the prior art are neither lightweight nor adapted to provide an acceptable wearing comfort especially for sport applications. Typically, the upper fits either tightly but uncomfortable or comfortable but loose. In case of a sports shoe this may lead to a lack of control of the foot movements, for example when sprinting or performing rapid changes of directions.

Therefore, the underlying problem of the present invention is to at least partly overcome the above mentioned deficiencies.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain examples, an upper for a shoe includes at least one tape portion covering at least 50% of the upper. In various examples, the at least one tape portion includes a plurality of connected tapes.

In some examples, the tapes are connected by at least one of the following processes: gluing, welding, stitching, preferably zig-zag stitched to each other on their edges.

According to certain examples, an upper for a shoe includes at least one tape portion including a plurality of connected tapes. In some cases, the tapes are zig-zag stitched to each other on their edges.

In various examples, the at least one tape portion covers at least 50% of the upper. In some cases, each tape comprises essentially parallel edges. In certain aspects, at least two tapes overlap each other. According to various cases, the tape portion extends in an instep part of the upper. In some examples, the tape portion extends from a medial edge of the upper to a lateral edge of the upper. In various cases, the tape portion is adapted to extend also below the foot.

In certain examples, the at least one tape portion is arranged in the heel part of the upper and preferably encompasses the heel part. In various aspects, the tape portion) includes at least two tapes connected to each other with an angle between 10° to 90°. In certain examples, the tape portion includes a plurality of essentially parallel tapes.

In some cases, the upper includes a first tape section with a plurality of essentially parallel tapes and a second tape section with a plurality of essentially parallel tapes. In various examples, the first tape section and the second tape section are not parallel.

In some examples, the plurality of tapes comprises a nylon, polyester or spandex material. In certain aspects, the tapes of the tape portion have a width from 30 mm to 40 mm, preferably from 35 mm to 40 mm. According to some examples, the tapes of the tape portion have a thickness from 1-5 mm.

According to some aspects, at least two tapes of the tape portion have different elasticities. In various examples, at least one tape of the tape portion includes at least one raised line. In certain examples, at least one tape portion is adapted to provide a different elasticity in the medial quarter part of the upper compared to the rest of the upper.

In various examples, the upper further includes an inner lining. In some examples, the tapes of the tape portion are attached to the inner lining, preferably by means of a hotmelt layer film. In certain cases, the upper further includes an outer layer. According to certain aspects, the outer layer preferably includes a thermoplastic polyurethane (TPU) material. In various cases, the outer layer includes a thickness from 0.1 mm to 1 mm, preferably from 0.20 mm to 0.40 mm and more preferably from 0.25 mm to 0.35 mm. In some cases, a first portion of the upper including the outer layer is adapted to provide a different elasticity than a second portion of the upper without the outer layer.

According to some examples, the upper further includes a mesh material in the toe part of the upper. In various aspects, wherein the upper is laceless.

In certain aspects, a shoe includes the upper. In some examples, the shoe is forefoot board lasted. In various examples, the tape portion is attached to a forefoot insole board of the shoe. In certain cases, the shoe comprises a transparent outsole.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

Possible embodiments of the present invention are further described in the following detailed description, with reference to the following figures.

BRIEF DESCRIPTION

Figure 1A:
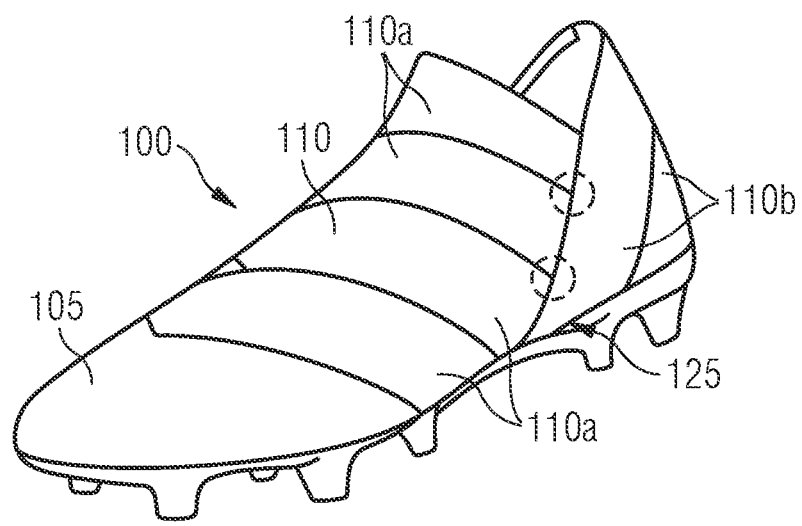
FIGS. 1A-B illustrate an embodiment of a soccer shoe including an upper according to the present invention.

The above mentioned problem is at least partly solved by an upper for a shoe, in particular a sports shoe, comprising: (a.) at least one tape portion covering at least 50% of the upper; (b.) wherein the at least one tape portion comprises a plurality of connected tapes.

Whereas in the prior art mentioned above an increased stability of the foot within an upper is provided by including tapes only in small parts of the upper such as the opening part receiving the foot, the present invention is based on a different approach: Here, at least 50% of the upper is covered by at least one tape portion comprising a plurality of connected tapes. The inventors found out that a significant percentage of the surface of the upper has to comprise a tape portion in order to achieve improved stability properties and sufficient wearing comfort at the same time. Hence, this feature provides a stabilization of the foot inside the shoe during extreme movements such as acceleration, slowing down and lateral movements. In this context, tapes may provide increased flexibility than conventional upper material as they may stretch so that they may fit tightly onto the surface of the foot.

Moreover, the tapes are connected. For example, if each tape is connected permanently to adjacent tapes, the upper may provide extraordinary stability properties especially for sports applications such as soccer or rugby. The plurality of connected tapes as a whole may be arranged and connected together in order to form a kind of stabilization cage such as a bandage for the foot so that an improved upper for the wearer may be provided which is lightweight and provides an acceptable wearing comfort. Again, this is particularly important for uppers for sport shoes. As a result, the invention combines an outstanding hold of the foot suitable even for extreme foot movements with outstanding comfort.

According to another aspect of the present invention, an upper comprises (a) at least one tape portion including a plurality of connected tapes, (b) wherein the tapes are zig-zag stitched to each other on their edges. The zig-zag stitch may be a three-point zig-zag stitch. Moreover, the at least one tape portion may cover at least 50% of the upper. Preferably the at least one tape portion may cover between 50% and 90% of the upper, more preferably between 50% and 75%.

The inventors found also out that such an upper may provide the possibility that the tapes of the at least one tape portion does not limit the stretching of both tapes compared to a normal stitch which would prevent at least one of the tapes to stretch. Therefore, a much better flexibility of such an upper may be provided. For example, if this upper is used for a soccer shoe, the wearer may not be impaired by the at least one tape portion when he dribbles with a ball.

In the following, embodiments for both aspects of the present invention mentioned above are described.

In some embodiments, each tape may comprise essentially parallel edges. In this context, "essentially" means up to a degree as relevant for shoe construction and within manufacturing tolerances. Thus, such tapes may even reinforce the above mentioned bandage functionality as they may be connected to each other along their parallel edges. Therefore, as the occurring external forces are more evenly distributed along the force lines on the parallel edges, there are no longer any point loads on certain parts of a foot during movements inside the shoe. Moreover, such tapes with essentially parallel edges may even facilitate the manufacturing of the upper as the tapes may be arranged more precisely and the edges may be connected by machines, e.g. by a stitching machine.

In some embodiments, the tapes may be connected by at least one of the following processes: gluing, stitching, welding. Each of these manufacturing techniques may provide different advantages for different needs. For example, gluing the tapes together may be needed for water impermeability such as for surfing shoes. In another example, stitching the tapes together is advantageous for high abrasion applications as seams may be repaired easily and cost-effectively. In still another example, welding the tapes together may be needed for sports applications wherein high forces occur such as motorsport racing so that the tapes may be connected almost indestructibly.

In all aspects of the present invention, the tapes may be zig-zag stitched to each other. As mentioned above, such a stitching technique may provide the possibility that the tapes of the at least one tape portion does not limit the stretching of both tapes compared to a normal stitch which would prevent at least one of the tapes to stretch.

At least two tapes may overlap each other. In such an embodiment, the tapes may provide a better connection to each other as the connection area for the connection process such as gluing, stitching, welding is bigger. Thus, a stronger connection between each tape may be provided so that such an upper may provide increased stability for a wearer. Moreover, overlapping tapes—for example two tapes may intersect each other—may further provide increased stability during torque movements of the foot. Therefore, such an upper may also provide additional reinforcing for the wearer during sport applications.

In some embodiments, the at least one tape portion may extend in an instep part of the upper. The inventors found out that such an embodiment may provide an improved performance for the sports movements of an athlete such as a soccer player as the instep part of the foot represents an important contact point for the soccer player. For example, if the soccer player shoots a ball, an extraordinary amount of energy is transferred to the ball. Therefore, this part has to provide increased stability which may be achieved by such an embodiment.

The at least one tape portion may extend from a medial edge of the upper to a lateral edge of the upper. Moreover, the tape portion may be adapted to extend also below the foot. Encompassing the foot with the tape portion may further support the above-described bandage functionality, as the tape portion may provide an increased stability between the foot and the upper material. Moreover, the wearing comfort as well as the flexibility for the foot may also be improved as the tape portion may fit more tightly onto the surface of the foot.

In some embodiments, the at least one tape portion may be arranged in the heel part of the upper and preferably encompasses the heel part. Such an arrangement of the tape portions may further increase the stability of the foot inside the upper, in particular, as the heel of the foot represents another important contact point for the movements of a wearer. Improving the stability in this area may be sufficient to avoid any slipping of the foot inside an upper for a sports shoe.

The at least one tape portion may comprise at least two tapes connected to each other with an angle between 10° to 90°. Such an embodiment may provide the possibility that each area of a foot may be covered with tape portions in order to provide a uniform distribution of occurring forces. For example, one tape may be provided in the heel part of the upper and may enlace the heel area of the foot wherein a plurality of other tapes may extend over the instep part of the upper from a lateral side to a medial side and may be connected to the tape portion of the heel part of the upper. Therefore, the foot may be almost bandaged with a significant tight fitting.

In some embodiments, the at least one tape portion may comprise a plurality of essentially parallel tapes. Moreover, the tape portion may comprise a first tape section with a plurality of essentially parallel tapes and a second tape section with a plurality of essentially parallel tapes, wherein the first tape section and the second tape section are not parallel. Such tapes may provide a tape portion being bigger with slimmer tapes so that a better distribution of occurring forces in a longitudinal direction of the foot, e.g. from the instep area to the toe area, may be provided. Furthermore, if, for example, the first tape section with a plurality of essentially parallel tapes is arranged in the instep part of the upper and the second tape section with a plurality of essentially parallel tapes is arranged in the heel part of the shoe upper, a more selective way to stabilize the wearer's foot may be provided.

The plurality of tapes may comprise a nylon, polyester or spandex material. Moreover, the tapes of the tape portion may have a width from 30 mm to 40 mm, preferably from 35 mm to 40 mm. The visible width may differ from the actual width of a tape due to overlapping. For example, tapes overlapping along the edges may appear narrower. In a more specific embodiment, the tapes of the tape portion may have a thickness from 1-5 mm. Such material and dimensions of the tapes may provide a good compromise between improved stability and flexibility of an upper including the tape portion. Moreover, such thicknesses may provide good stretch properties of an upper including the tape portion. If the tapes may have a 3D geometry, the thickness may be even higher.

At least two tapes of the tape portion may have different elasticities. For example, at least one longitudinal tape may be arranged on at least one tape. The longitudinal tape may be narrower than the tape. In the midfoot part of the upper, the longitudinal tapes may be straight and in the forefoot and/or heel part of upper, they may comprise a wave shape. Alternatively to using an additional tape on top of another the tapes may also have a 3D geometry. For example at least one tape of the tape portion may comprise at least one raised line. The different structures/geometries of the tapes may be used to create different properties of the tapes, e.g. elasticity. For example, by adjusting the number and/or the form of raised lines on top of the tapes, the elasticity can be easily adapted.

Moreover, at least one tape portion may be adapted to provide a different elasticity in the medial quarter part of the upper compared to the rest of the upper. The inventors found out that such an embodiment may provide an improved performance for an athlete such as a soccer player. For example, if at least one tape portion may have a lower elasticity in the medial quarter part of the upper, the upper may fit tightly around the area of the ankle of the foot and the soccer player has not to close the laces too tight. In addition, the rest of the upper may have a higher elasticity in order to provide the stability properties as mentioned above. As a result, possible skin injuries, such as bruises, may be avoided.

The upper may further comprise an inner lining. Moreover, the tapes of the tape portion may be attached to the inner lining, preferably by means of a hotmelt layer film. For example, the inner lining may be arranged behind each tape in the tape portion of the upper. Such an inner lining may provide increased stability of the whole upper. Therefore, the bandage functionality of the upper may be improved.

The upper may further comprise an outer layer, the outer layer preferably comprising a thermoplastic polyurethane (TPU) material. Moreover, the outer layer may comprise a thickness from 0.1 mm to 1 mm, preferably from 0.20 mm to 0.40 mm and more preferably from 0.25 mm to 0.35 mm.

In some embodiments, a first portion of the upper comprising the outer layer may be adapted to provide a different elasticity than a second portion of the upper without the outer layer. Such an embodiment enables to provide easily different portions with different elasticities only by placing or not the outer layer onto the surface of the upper instead of using different tapes. For example, a first portion may comprise the outer layer in order to provide more stability compared to a second portion providing more stretch and flexibility. Therefore, the desired stretch may be simply adjusted depending on the needs of the wearer.

The upper may further comprise a mesh material in the toe area. For example, a knit made up of polyester and polyurethane (PU) coated yarns may be used. Such a mesh material may provide a cage for increased stability to the upper. Moreover, the mesh material may also improve other properties of the shoe such as its ventilation properties.

In some embodiments, the upper may be laceless. Such an upper without laces may provide extraordinary stability for the foot of a wearer inside the upper, especially for sports applications.

According to another aspect, the present invention relates to a shoe comprising an upper according to the invention. Moreover, the shoe may be forefoot board lasted. As explained above, such an upper provides a high stability, support and comfort to a wearer as the tape portion allows for fitting tightly to the dimensions of a foot of the wearer.

In some embodiments, the tape portion may be attached, e.g. glued or stitched, to a forefoot insole board of the shoe. In a more specific embodiment, the shoe may comprise a transparent outsole. Thus, the wrapping tapes may be visible from the outside. The outsole may be transparent in the midfoot part only, i.e. the other parts of the outsole may be opaque. To this end, the other parts of the outsole may comprise a print, e.g. a backside print.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Possible embodiments and variations of the present invention are described in the following with particular reference to an upper, a soccer shoe and a sports shoe. However, the concept of the present invention may identically or similarly be applied to any upper or sports shoe such as for basketball, American football, rugby, baseball, snowboard, running, athletics, or any leisure shoe such as sneakers, slippers, moccasins, etc.

Moreover, for brevity only a limited number of embodiments are described in the following. However, the skilled person will recognize that the specific features described with reference to these embodiments may be modified and combined differently and that certain aspects of the specific embodiments may also be omitted. Moreover, it is noted that the aspects described in the subsequent detailed description may be combined with aspects described in the above summary section.

Figure 1B:
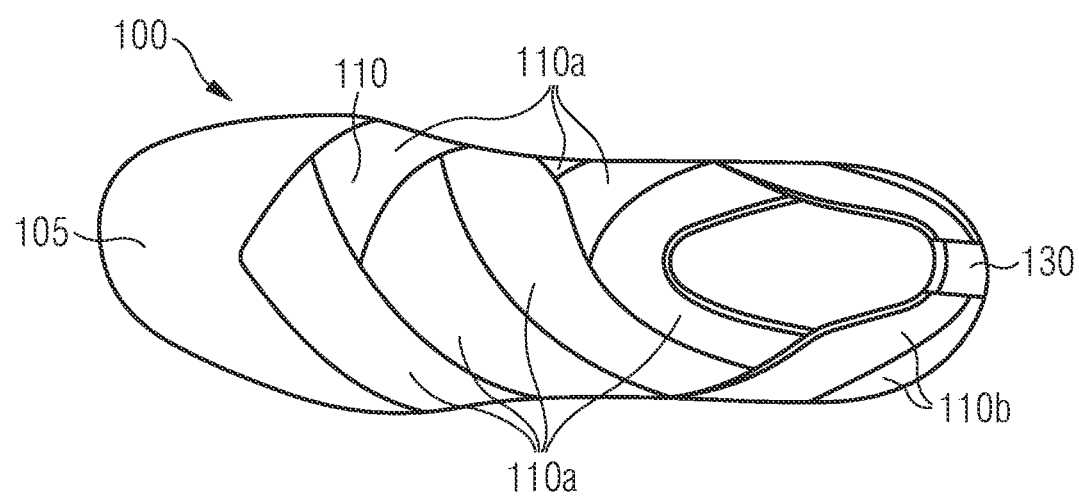

FIGS. 1A-B illustrate a possible embodiment of a soccer shoe 100 in different views. The soccer shoe 100 comprises an upper 105 including at least one tape portion 110, which covers at least 50% of the upper 105. In the exemplary embodiment of FIGS. 1A-B, the tape portion 110 is made up of a first tape section 110a and a second tape section 110b.

The tape portion 110, comprises a plurality of connected tapes. As can be seen in FIGS. 1A-B, the upper 105 may be laceless. However, it is also conceivable that the upper 105 may have laces.

In context of this application, a tape portion may be formed by connecting a plurality of tapes which may be made, e.g. be woven, from a flexible material in order to provide a significant stretchability compared to the rest of the upper material. Polyurethane or thermoplastic polyurethane polymers have been found to be effective. However, it should be understood that many other materials that are flexible and have limited stretch characteristics could be effective materials for the tapes. Other examples may include, by way of example only, leather, plastics, rubber, meshes or fabrics. Therefore, the flexible or elastic tapes may increase tactile sensation, stability and comfort level experienced by the wearer.

The tapes used for the present invention may have a tensile strength stretching under a load of 50 N of between 103% and 109%. However, it is possible to use tapes with more or less stretch for certain applications. Also, the elasticity of the tapes may vary across an upper of the present invention. For example, the tapes near the foot opening may provide more stretch to allow for an easy insertion of the foot, whereas the tapes on the lateral and medial sides may have less stretch to allow for better support of the foot.

In one embodiment, the tapes may be connected by at least one of the following processes: gluing, welding, stitching. Each of these manufacturing techniques may provide different advantages for different needs. For example, gluing the tapes together may be needed for water impermeability such as for surfing shoes. In another example, stitching the tapes together is advantageous for high abrasion applications as seams may be repaired easily and cost-effectively. In still another example, welding the tapes together may be needed for sports applications wherein high forces occur such as motorsport racing so that the tapes may be connected almost indestructibly.

In the embodiment of FIG. 1A, the upper 105 is presented in a side lateral view. The at least one tape portion 110 may cover the whole upper 105 besides the toe part. It is also conceivable that the toe part of the upper may further comprise tapes such as the tapes of the at least one tape portion 110. As can be seen in FIG. 1A, the tape section 110a comprises four tapes, wherein each of them comprises essentially parallel edges. As mentioned above, occurring external forces may be more evenly distributed along the force lines on the parallel edges so that there may be no longer any point loads on certain parts of a foot during movements inside the sports shoe 100.

Moreover, the tape section 110a extends in an instep part of the upper 105. The tapes of the tape portion 110a overlap each other one after the other which can be better seen in FIG. 1B. Furthermore, the upper 105 comprises another tape portion 110b including two tapes which are arranged in the heel part of the upper 105 and preferably enlace the heel part below the foot (not shown in FIG. 1A). Therefore, the tape section 110b in the heel part of the upper 105 may extend from a medial edge (not shown in FIG. 1A) to a lateral edge 125 or vice versa.

As can be seen in FIG. 1A, one tape of the tape section 110a and one tape of the tape section 110b overlap each other as indicated with dashed circles. Such an overlapping of connected tapes in the collar part of the upper 105 may allow that the tape section 110a may be stretched when a foot is inserted into the upper 105 as the tape section 110b may provide a lock mechanism for the tape section 110a. On the contrary, the tape section 110a may also provide a lock mechanism for the tape portion 110a when the foot is whipped backwards due to a reverse pulse, for example after shooting a ball.

Moreover, the two tapes of the tape section 110a and 110b are connected to each other with an angle between 10° to 90°, approximately 80°. Such an angle in the collar part of the upper 105 may allow that the wearer, e.g. a soccer player, may be not impaired when he is wearing shin guards with guards for the ankles. Additionally or alternatively, the upper 105 may comprise a further tape section in the ankle area of the upper 105 in order to provide increased stability for other sport applications such as running.

As can be seen in FIG. 1A, the four lateral tapes of tape section 110a are essentially parallel and the two tapes of tape section 110b are essentially parallel, wherein the four tapes of tape section 110a and the two tapes of tape section 110b are not parallel. Advantageously, such an arrangement may improve the flexibility of the foot joint along the line from the ankle area of a foot to the lateral and/or medial edge of the upper 105 during e.g. passing a ball.

In one embodiment, the plurality of tapes in the tape portion 110 may comprise a nylon material. Moreover, the tapes of the tape portion 110 may have a width from 30 mm to 40 mm, preferably from 35 mm to 40 mm. For example, the tapes may be woven tapes which are available from the supplier Paiho Group. Moreover, the material may also comprise polyester and/or spandex. In addition, the woven tapes may be Jacquard woven tapes. The tapes of the tape portion may comprise raised lines on them, i.e. may have a 3D structure. Different kinds of lines, e.g. straight, waves, may be possible and may influence selectively the elasticity of the tapes.

In a more specific embodiment, the tapes of the tape portion 110 may have a thickness from 1 to 5 mm. As mentioned above, such dimensions of the tapes of the tape portion 110 may provide a good compromise between improved stability and flexibility of the upper 105. Moreover, such thicknesses may provide good stretch properties of an upper 105 including the tape portion 110.

In FIG. 1B, the upper 105 is presented in a top view. As can be seen there, the tape section 110a includes three further tapes extending in the instep part of the upper 105 from the medial edge of the upper 105. Moreover, the three tapes extending from the medial edge of the upper 105 overlap alternating with the four tapes extending from the lateral edge 125 of the upper 105. Therefore, the above mentioned bandage functionality may be provided in such an upper and extraordinary stability properties may be achieved.

Moreover, the upper 105 comprises a heel strip 130. Such a heel strip 130 may further lock the tapes of the tape section 110b in order to provide sufficient stability in the heel part of the upper 105.

Figure 2A:
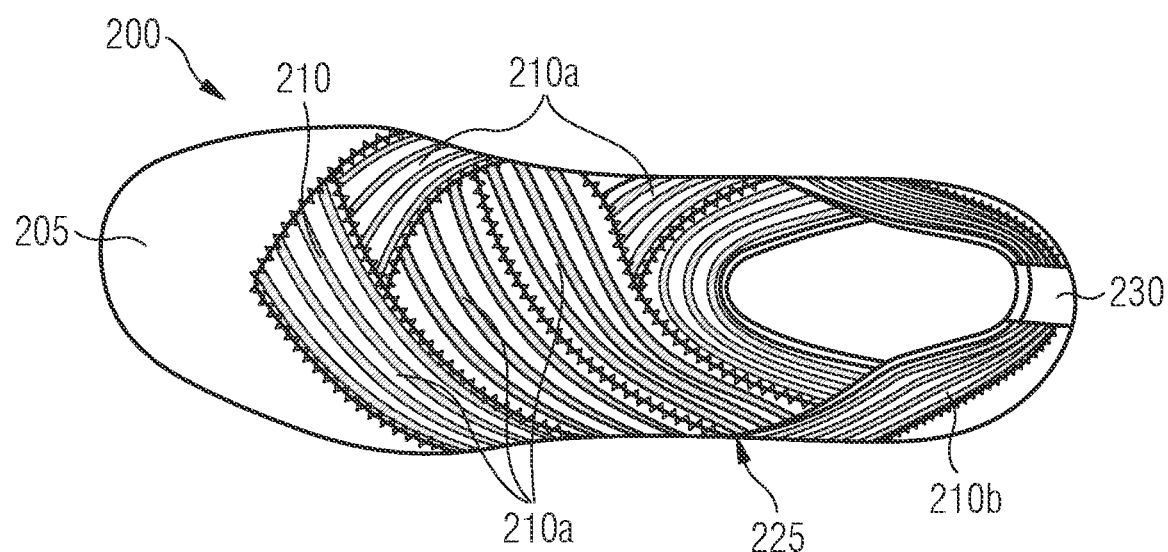
FIGS. 2A-B illustrate an embodiment of a soccer shoe including an upper according to another aspect of the present invention.
Figure 2B:
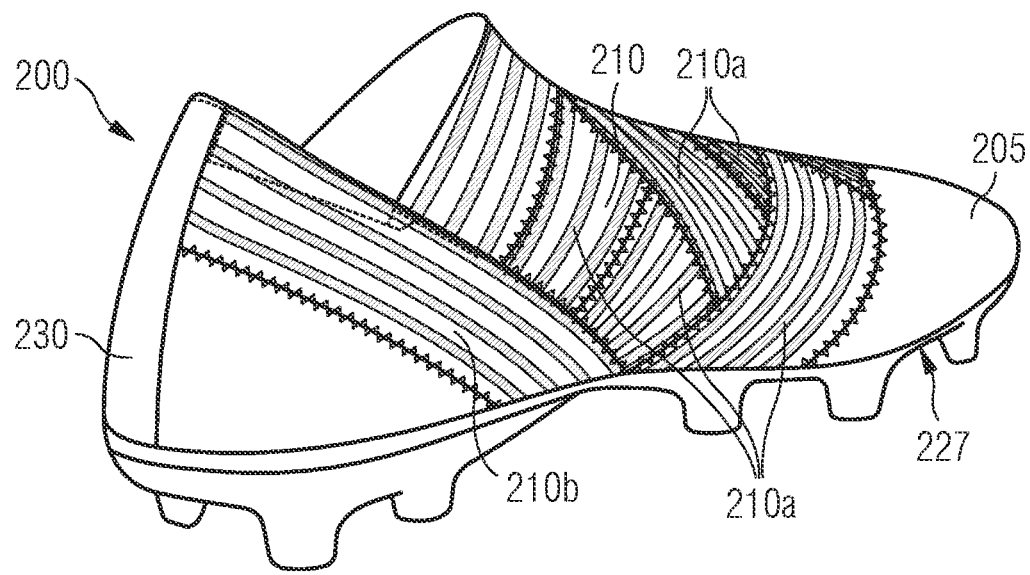

FIGS. 2A-B present a possible embodiment of a soccer shoe 200 including an upper 205 according to another aspect of the present invention in different views. The upper 205 of soccer shoe 200 comprises similar features as the upper 105 of soccer shoe 100 as shown in FIGS. 1A-B. The upper 205 comprises at least one tape portion 210 including a plurality of connected tapes, wherein the tapes are zig-zag stitched to each other on their edges. In the exemplary embodiment of FIGS. 2A-B, the tape portion 210 is made up of a first tape section 210a and a second tape section 210b. As can be seen in FIGS. 2A-B, the upper 205 may be laceless. However, it is also conceivable that the upper 205 may have laces. Moreover, in one embodiment wherein the upper 205 may have laces, the upper 205 may further comprise a 4-way stretch woven material in the tongue part of the upper 205.

In FIG. 2A, the upper 205 is presented in a top view. The at least one tape portion 210 covers the whole upper 205 besides the toe part and the lower heel part as can be seen in FIG. 2B. It is also conceivable that the toe part and the lower heel part of the upper 205 may further comprise tapes such as the tapes of the at least one tape portion 210. It is also conceivable that the tape portion 210 covers less of the upper 205 than in the embodiment of FIGS. 2A-B. In particular, the tape portion 210 comprising the zig-zag stitched tapes may cover less than 50% of the upper 205.

As can be seen in FIG. 2A, the tape section 210a comprises six tapes, namely three extending from a lateral edge 225 to the instep part of the upper 205 and three tapes extending from a medial edge 227 (shown in FIG. 2B) to the instep part of the upper 205, wherein each of them comprises essentially parallel edges. Again, occurring external forces may be more evenly distributed along the force lines on the parallel edges so that there may be no longer any point loads on certain parts of a foot during movements inside the sports shoe 200.

The tape section 210b comprises just a single tape which enlaces the heel part below the foot (not shown in FIGS. 2A-B). This tape is joined to the tapes of the tape section 210a by a zig-zag stitch to allow for stretching along the stitch line as described herein.

As can be seen in FIG. 2B, the tapes in the midfoot part of the tape section 210a may overlap in the longitudinal direction, i.e. perpendicular to their stitching edges, to the tapes of the tape section 210b. The tapes of the tape section 210a may be stitched from the inside to the tapes of the tape section 210b. This overlapping may enable a higher stability and a better control of the stretch in parts where it is needed, for example in the midfoot part of laceless uppers.

Moreover, some of the tapes of the tape section 210a may overlap along their stitching edges in the midfoot part of the upper 205. Thus, a better fit and a higher quality of the upper 305 may be provided.

Figure 3A:
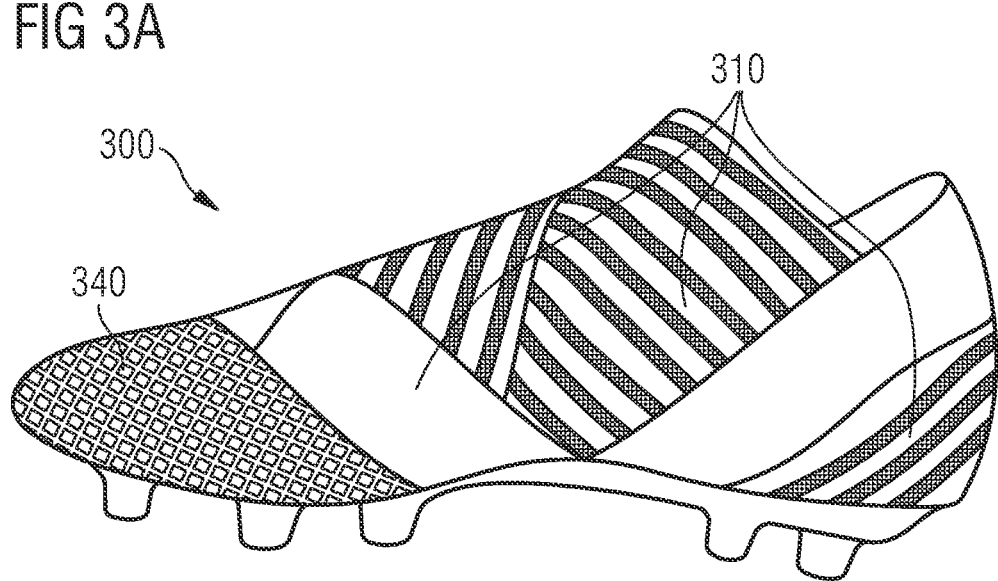
FIGS. 3A-B illustrate an embodiment of a soccer shoe including an upper according to the present invention.
Figure 3B:
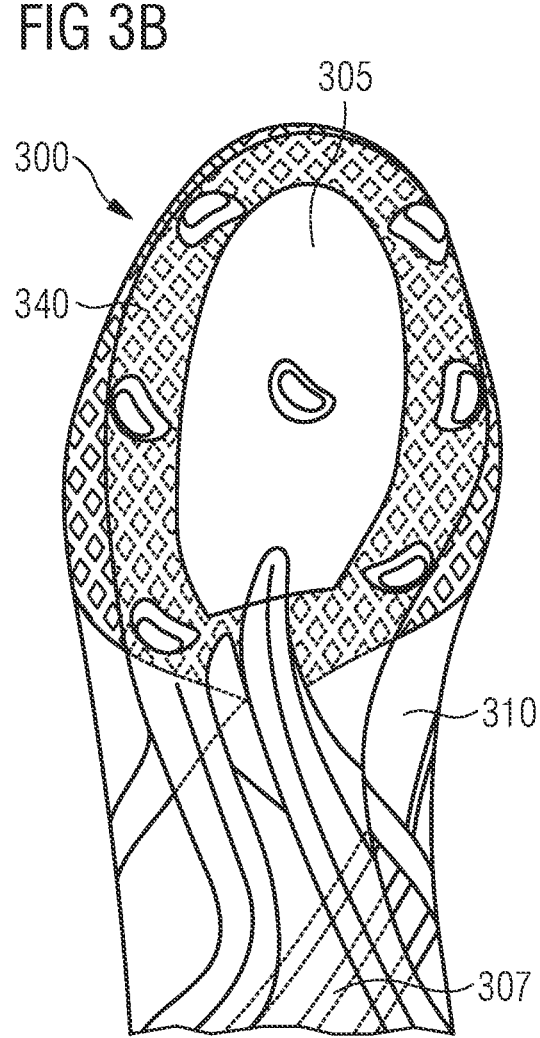

FIGS. 3A-B present a possible embodiment of a soccer shoe 300 including an upper 305 according to the present invention. The upper 305 of the soccer shoe 300 comprises similar features as the uppers 105 and 205 of the soccer shoes 100 and 200 as shown in FIGS. 1A-B and 2A-B.

As can be seen in FIG. 3A, the soccer shoe 300 is presented in a medial side view. The upper 305 of the soccer shoe 300 comprises a tape portion 310 including four tapes extending in an instep part of the upper 305 from a medial edge of the upper 305, two tapes extending in an instep part of the upper 305 from a lateral edge (not shown in FIG. 3A) of the upper 305 and two tapes in the heel part of the upper 305.

Moreover, the upper 305 comprises a mesh material in the toe part 340 of the upper 305. The mesh material comprises a material called "Xtex" which is a knit made up of polyester. The Xtex material may also have PU coated yarns. As mentioned above, such a toe part 340 may improve other properties of the soccer shoe 300 such as its ventilation properties when using uncoated Xtex material.

In one embodiment, the soccer shoe 300 may be forefoot lasted and may use an injected half insole board. As explained above, such an upper provides a high stability, support and comfort to a wearer as the tape portion 310 allows for fitting tightly to the dimensions of a foot of the wearer.

Furthermore, the upper 305 may comprise an inner lining (not shown in FIGS. 3A-B). Moreover, the tapes of the tape portion 310 may be attached to the inner lining, preferably by means of a hotmelt layer film. For example, the inner lining may comprise a suede material and may be arranged behind each tape in the tape portions 310 of the upper 305. As mentioned above, such an inner lining may provide increased stability of the whole upper 305.

In one embodiment, the upper 305 may comprise a foamed material between the inner lining and the tapes of the tape portion 310. Such a foamed material, e.g. a foamed polymer may fill the space between the inner lining and the tapes of the tape portion in order to provide improved cushioning and/or thermal insulation properties for winter applications such as for softboots for snowboarding.

Moreover, the upper may further comprise an outer layer (not shown in FIGS. 3A-B), the outer layer preferably comprising a thermoplastic polyurethane, TPU, material. Moreover, the outer layer may comprise a thickness from 0.1 mm to 1 mm, preferably from 0.20 mm to 0.40 mm and more preferably from 0.25 mm to 0.35 mm.

Furthermore, a first portion of the upper 305, e.g. the tapes with stripes, comprising the outer layer may be adapted to provide a different elasticity than a second portion, e.g. the tapes in the heel part, of the upper 305 without the outer layer. Thus, different elasticities may be easily provided in different tape portions and therefore the desired stretch may be simply adjusted depending on the needs of the wearer.

As can be seen in FIG. 3B, the soccer shoe 300 is presented in a bottom view. The soccer shoe 300 comprises a transparent sole 307, wherein the heel part and the forefoot part the outsole plate may be not transparent. Moreover, the tape portions 310 encompass the whole upper 305 so that a foot may be bandaged. Thus, the stability properties of the upper 305 may be further increased. Additionally or alternatively, several tapes may overlap to each other so that the bandage functionality may be further increased.

Figure 4:
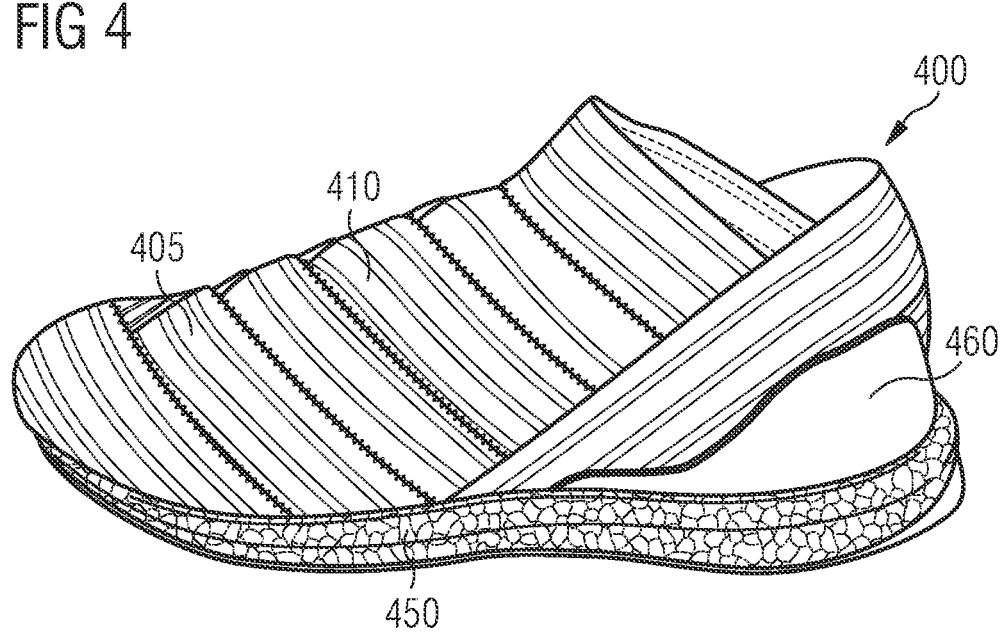
FIG. 4 illustrates an embodiment of a sports shoe including an upper according to the present invention.

FIG. 4 presents a possible embodiment of a sports shoe 400 including an upper 405 according to the present invention. The upper 405 of the sports shoe 400 comprises a tape portion 410 including four tapes extending in an instep part of the upper 305 from a lateral edge of the upper 405 and two tapes in the heel part of the upper 405. Moreover, the upper 405 of sports shoe 400 comprises similar features as the uppers 105, 205 and 305 of soccer shoes 100, 200 and 300, respectively, as shown in FIGS. 1A-B, 2A-B and 3A-B, respectively.

Furthermore, the upper 405 comprises a sole 450 including a plurality of randomly arranged expanded particles. These particles may be made from an expanded material such as expanded thermoplastic polyurethane. It is also conceivable that any other appropriate material may be used. Furthermore, the expanded particles may be randomly arranged or with a certain pattern inside a mold.

Moreover, the sports shoe 400 may be board lasted, such as forefoot board lasted, or strobel lasted.

As can be seen in FIG. 4, the upper 405 further comprises in the toe part of the upper 405 another tape of the tape portion 410. Moreover, the upper 405 comprises a heel supporting element 460 in the lower heel part of the upper 405. Additionally or alternatively, the heel supporting element may encompass the entire heel part of the upper 405.

Figure 5A:
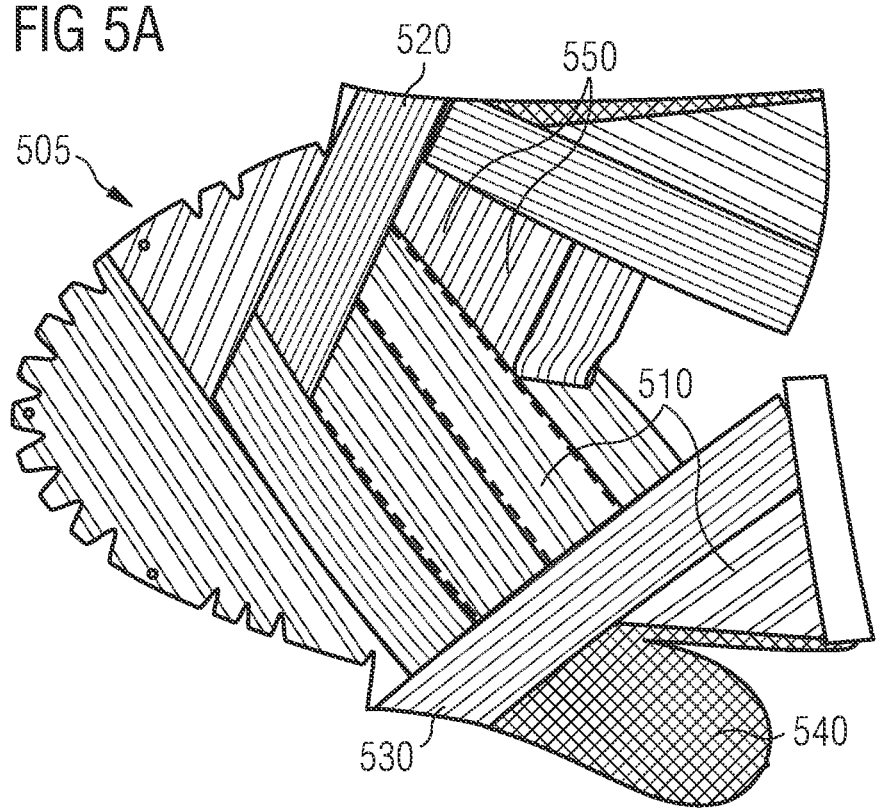
FIGS. 5A-B illustrate an embodiment of an upper in accordance with the present invention.
Figure 5B:
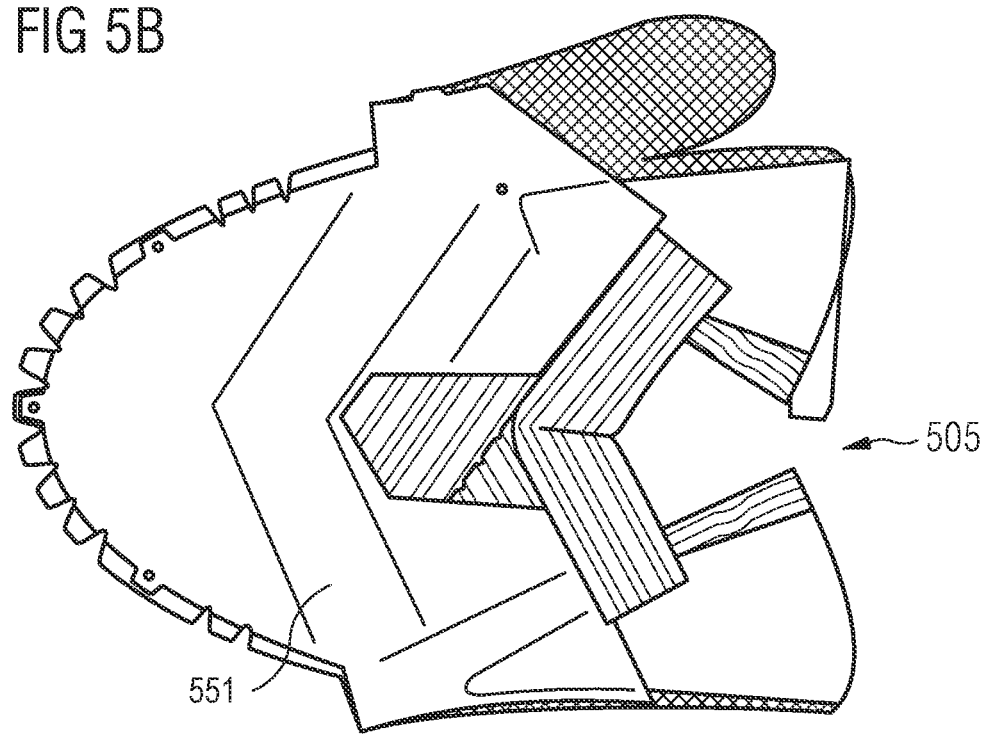

FIGS. 5A-B present a possible embodiment of an upper 505 in accordance with the present disclosure in a two-dimensional view before the upper 505 will be formed into a three-dimensional upper. FIG. 5A represents a front view of the upper 505, whereas FIG. 5B represents a back view of the upper 505. The upper 505 comprises similar features as the uppers 105, 205, 305 and 405 as shown in FIGS. 1A-B, 2A-B, 3A-B and 4, respectively.

As can be seen in FIG. 5A, the upper 505 comprises a tape portion 510 including a plurality of tapes in an instep part of the upper 505 and another plurality of tapes extending in a heel part of the upper 505.

Moreover, the upper 505 comprises a mesh material 540 which forms a part of the insole. The mesh material comprises a material called "Xtex" which is a knit made up of polyester. The Xtex material may also have PU coated yarns. It is also conceivable that the mesh may be provided in the heel and/or in the forefoot part, e.g. the toe part, of the upper 505.

When the two-dimensional upper 505 is formed into a three-dimensional upper 505, the tapes indicated by reference numerals 520 and 530, respectively, are connected to each other in the midfoot sole area of the upper 505, e.g. by a flat lock stitch.

Furthermore, as can be seen in the front view of FIG. 5A, the two tapes denoted by reference numeral 550 are running below the tapes in the midfoot area. The tapes 550 are stitched from the inside to the tapes in the midfoot area along the stitch lines which are indicated by the dashed lines in FIG. 5A.

As shown in the back view of FIG. 5B, the upper 505 comprises an inner lining 551. This lining 551 provides increased stability for the upper 505.

In the following, further examples are described to facilitate the understanding of the invention:

1. Upper (105; 305; 405; 505) for a shoe, in particular a sports shoe, comprising:
    a. at least one tape portion (110*a-b*; 210*a-b*; 310; 410) covering at least 50% of the upper (105; 305; 405);
    b. wherein the at least one tape portion (110*a-b*; 210*a-b*; 310; 410) comprises a plurality of connected tapes.
2. Upper (105; 305; 405; 505) according to example 1, wherein the tapes are connected by at least one of the following processes: gluing, welding, stitching, preferably zig-zag stitched to each other on their edges.
3. Upper (205) for a shoe, in particular a sports shoe, comprising
    c. at least one tape portion (110*a-b*; 210*a-b*; 310; 410) including a plurality of connected tapes,
    d. wherein the tapes are zig-zag stitched to each other on their edges.
4. Upper (205) according to the preceding example, wherein the at least one tape portion (110*a-b*; 210*a-b*; 310; 410) covers at least 50% of the upper.
5. Upper (105; 205; 305; 405; 505) according to one of the preceding examples, wherein each tape comprises essentially parallel edges.
6. Upper (105; 205; 305; 405; 505) according to one of the preceding examples, wherein at least two tapes overlap each other.
7. Upper (105; 205; 305; 405; 505) according to one of the preceding examples, wherein the tape portion (110*a-b*; 210*a-b*; 310; 410) extends in an instep part of the upper (105; 205; 305; 405; 505).
8. Upper (105; 205; 305; 405; 505) according to one of the preceding examples, wherein the tape portion (110*a-b*; 210*a-b*; 310; 410) extends from a medial edge (227) of the upper to a lateral edge (225) of the upper.

9. Upper (105; 205; 305; 405; 505) according to one of the preceding examples, wherein the tape portion (110a-b; 210a-b; 310; 410) is adapted to extend also below the foot.

10. Upper (105; 205; 305; 405; 505) according to one of the preceding examples, wherein the at least one tape portion (110a-b; 210a-b; 310; 410) is arranged in the heel part of the upper and preferably encompasses the heel part.

11. Upper (105; 205; 305; 405; 505) according to one of the preceding examples, wherein the tape portion (110a-b; 210a-b; 310; 410) comprises at least two tapes connected to each other with an angle between 10° to 90°.

12. Upper (105; 205; 305; 405; 505) according to one of the preceding examples, wherein the tape portion (110a-b; 210a-b; 310; 410) comprises a plurality of essentially parallel tapes.

13. Upper (105; 205; 305; 405; 505) according to the preceding example, comprising a first tape section (110a; 210a) with a plurality of essentially parallel tapes and a second tape section (110b; 210b) with a plurality of essentially parallel tapes, wherein the first tape section and the second tape section are not parallel.

14. Upper (105; 205; 305; 405; 505) according to one of the preceding examples, wherein the plurality of tapes comprises a nylon, polyester or spandex material.

15. Upper (105; 205; 305; 405; 505) according to one of the preceding examples, wherein the tapes of the tape portion (110a-b; 210a-b; 310; 410) have a width from 30 mm to 40 mm, preferably from 35 mm to 40 mm.

16. Upper (105; 205; 305; 405; 505) according to one of the preceding examples, wherein the tapes of the tape portion (110a-b; 210a-b; 310; 410) have a thickness from 1-5 mm.

17. Upper (105; 205; 305; 405; 505) according to one of the preceding examples, wherein at least two tapes of the tape portion (110a-b; 210a-b; 310; 410) have different elasticities.

18. Upper (105; 205; 305; 405; 505) according to one of the preceding examples, wherein at least one tape of the tape portion (110a-b; 210a-b; 310; 410) comprises at least one raised line.

19. Upper (105; 205; 305; 405; 505) according to one of the preceding examples, wherein at least one tape portion (110a-b; 210a-b; 310; 410) is adapted to provide a different elasticity in the medial quarter part of the upper compared to the rest of the upper.

20. Upper (105; 205; 305; 405; 505) according to one of the preceding examples, wherein the upper further comprises an inner lining (550).

21. Upper (105; 205; 305; 405; 505) according to the preceding example, wherein the tapes of the tape portion (110a-b; 210a-b; 310; 410) are attached to the inner lining (550), preferably by means of a hotmelt layer film.

22. Upper (105; 205; 305; 405; 505) according to one of the preceding examples, wherein the upper further comprises an outer layer, the outer layer preferably comprising a thermoplastic polyurethane, TPU, material.

23. Upper (105; 205; 305; 405; 505) according to the preceding example, wherein the outer layer comprises a thickness from 0.1 mm to 1 mm, preferably from 0.20 mm to 0.40 mm and more preferably from 0.25 mm to 0.35 mm.

24. Upper (105; 205; 305; 405; 505) according to example 22 or 23, wherein a first portion of the upper comprising the outer layer is adapted to provide a different elasticity than a second portion of the upper without the outer layer.

25. Upper (105; 205; 305; 405; 505) according to one of the preceding examples, further comprising a mesh material in the toe part (340; 540) of the upper.

26. Upper (105; 205; 305; 405; 505) according to one of the preceding examples, wherein the upper is laceless.

27. Shoe (100; 200; 300; 400) comprising an upper (105; 205; 305; 405; 505) according to one of the preceding examples.

28. Shoe (100; 200; 300; 400) according to the preceding example, wherein the shoe is forefoot board lasted.

29. Shoe (100; 200; 300; 400) according to one of the preceding examples, wherein the tape portion (110a-b; 210a-b; 310; 410) is attached to a forefoot insole board of the shoe.

30. Shoe (100; 200; 300; 400) according to one of the examples 27-29, wherein the shoe comprises a transparent outsole.

It should be emphasized that the above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. An upper for a shoe comprising:
   a. at least one tape portion covering at least 50% of the upper;
   b. wherein the at least one tape portion comprises a plurality of connected tapes,
   wherein each tape of the plurality of connected tapes comprises a length, a first edge extending along the length of the tape, a width, and a second edge extending along the width of the tape, wherein the width is less than the length,
   wherein at least two adjacent tapes of the plurality of connected tapes are connected along their lengths and adjacent to their first edges, and
   wherein at least two tapes of the plurality of connected tapes are connected to each other with a non-zero angle between their first edges of at least 10°.

2. The upper of claim 1, wherein the tapes are connected by gluing, welding, or zig-zag stitching to each other on their edges.

3. An upper for a shoe comprising:
   a. at least one tape portion including a plurality of connected tapes, each tape comprising a length, a first edge extending along the length of the tape, a width, and a second edge extending along the width of the tape, wherein the width is less than the length;
   b. wherein at least two adjacent tapes of the plurality of connected tapes are zig-zag stitched to each other along their lengths and adjacent to their first edges, and wherein at least two tapes of the plurality of connected tapes are connected to each other with a non-zero angle between their first edges of at least 10°.

4. The upper of claim 3, wherein the at least one tape portion covers at least 50% of the upper.

5. The upper of claim 3, wherein each tape comprises essentially parallel edges.

6. The upper of claim 3, wherein at least two tapes overlap each other.

7. The upper of claim 3, wherein the tape portion extends in an instep part of the upper.

8. The upper of claim 3, wherein the tape portion extends from a medial edge of the upper to a lateral edge of the upper.

9. The upper of claim 3, wherein the tape portion is configured to extend below a user's foot when the shoe is worn.

10. The upper of claim 3, wherein the at least one tape portion is arranged in a heel part of the upper and encompasses the heel part.

11. The upper of claim 3, wherein the non-zero angle is between 10° to 90°.

12. The upper of claim 3, wherein the tape portion comprises a plurality of essentially parallel tapes.

13. The upper of claim 3, further comprising a first tape section with a plurality of essentially parallel tapes and a second tape section with a plurality of essentially parallel tapes, wherein the first tape section and the second tape section are not parallel.

14. The upper of claim 3, wherein the plurality of tapes comprises a nylon, polyester or spandex material.

15. The upper of claim 3, wherein the tapes of the tape portion have a width from 30 mm to 40 mm.

16. The upper of claim 3, wherein the tapes of the tape portion have a thickness of from 1-5 mm.

17. The upper of claim 3, wherein at least two tapes of the tape portion have different elasticities.

18. The upper of claim 3, wherein at least one tape of the tape portion comprises at least one raised structure on a surface the tape portion.

19. The upper of claim 3, wherein at least one tape portion is adapted to provide a different elasticity in a medial quarter part of the upper compared to the rest of the upper.

20. The upper of claim 3, wherein the upper further comprises an inner lining.

21. The upper of claim 20, wherein the tapes of the tape portion are attached to the inner lining.

22. The upper of claim 3, wherein the upper further comprises an outer layer, the outer layer preferably comprising a thermoplastic polyurethane material.

23. The upper of claim 22, wherein the outer layer comprises a thickness from 0.1 mm to 1 mm.

24. The upper of claim 23, wherein a first portion of the upper comprising the outer layer is adapted to provide a different elasticity than a second portion of the upper without the outer layer.

25. The upper of claim 3, further comprising a mesh material in a toe part of the upper.

26. The upper of claim 3, wherein the upper is laceless.

27. A shoe comprising the upper of claim 3.

28. The shoe of claim 27, wherein the shoe is forefoot board lasted.

29. The shoe of claim 27, wherein the tape portion is attached to a forefoot insole board of the shoe.

30. The shoe of claim 27, wherein the shoe comprises a transparent outsole.

* * * * *